(12) United States Patent
Zhang et al.

(10) Patent No.: US 6,554,470 B2
(45) Date of Patent: Apr. 29, 2003

(54) M-LEVEL DIODE JUNCTION TEMPERATURE MEASUREMENT METHOD CANCELLING SERIES AND PARALLEL PARASITIC INFLUENCES

(75) Inventors: Hong Zhang, Mountain View, CA (US); William Robert Rypka, Red Bluff, CA (US); Emy Tan, Cupertino, CA (US); Mansour Izadinia, Los Altos Hills, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 10/045,115

(22) Filed: Oct. 26, 2001

(65) Prior Publication Data

US 2003/0031229 A1 Feb. 13, 2003

Related U.S. Application Data

(60) Provisional application No. 60/246,311, filed on Nov. 7, 2000.

(51) Int. Cl.[7] .................................................. G01K 7/01
(52) U.S. Cl. ....................... 374/178; 374/170; 374/172; 374/175
(58) Field of Search ......................... 374/178, 170–173, 374/175, 163, 1; 327/512, 382; 307/310; 257/467; 716/4

(56) References Cited

U.S. PATENT DOCUMENTS

| | | | | |
|---|---|---|---|---|
| 3,812,717 A | * | 5/1974 | Miller et al. ................. | 374/178 |
| 3,996,451 A | | 12/1976 | Harrington et al. ........... | 377/25 |
| 4,123,698 A | * | 10/1978 | Timko et al. ................. | 323/316 |
| 4,228,684 A | * | 10/1980 | Templin ....................... | 374/178 |
| 4,636,092 A | * | 1/1987 | Hegyi .......................... | 374/178 |
| 5,154,514 A | | 10/1992 | Gambino et al. ............ | 374/178 |
| 5,195,827 A | | 3/1993 | Audy et al. .................. | 374/172 |
| 5,401,099 A | * | 3/1995 | Nishizawa et al. .......... | 374/178 |
| 5,781,075 A | * | 7/1998 | Bolton, Jr. et al. .......... | 374/178 |
| 5,982,221 A | * | 11/1999 | Tuthill ......................... | 374/178 |
| 5,990,725 A | | 11/1999 | LoCascio et al. ............ | 327/512 |
| 6,019,508 A | * | 2/2000 | Lien ............................ | 374/178 |
| 6,097,239 A | * | 8/2000 | Miranda, Jr. et al. ........ | 374/178 |
| 6,144,246 A | * | 11/2000 | Wachter ...................... | 327/513 |
| 6,149,299 A | * | 11/2000 | Aslan et al. ................. | 374/178 |

\* cited by examiner

Primary Examiner—Diego Gutierrez
Assistant Examiner—Stanley J. Pruchnic, Jr.
(74) Attorney, Agent, or Firm—Perkins Coie LLP (57) ABSTRACT

The present invention provides an improved method and apparatus to measure p-n junction device temperature by testing a device with M-Levels of applied collector current, sensing changes in output characteristics, and calculating the device current offset error and leakage current error due to parasitic parallel resistance where the leakage current error due to parasitic parallel resistance may be treated and eliminated as current offset error. Application of M levels of excitation values, where M is greater than or equal to four, eliminates device series parasitic effects, comprised of voltage offset and a series parasitic resistance, and parallel parasitic effects, comprised of current offset error and leakage current error due to parasitic parallel resistance, from temperature measurements. Since the operating characteristics of the device are temperature dependent, excitation levels applied and output values observed are used to determine junction temperature of the device free of series and parallel parasitic effects.

20 Claims, 4 Drawing Sheets

M-LEVEL DIODE JUNCTION TEMPERATURE MEASUREMENT METHOD CANCELLING SERIES AND PARALLEL PARASITIC INFLUENCES

CROSS REFERENCE TO RELATED APPLICATIONS

This Application claims the benefit of U.S. Provisional Application No. 60/246,311, filed Nov. 7, 2000, the disclosure of which is incorporated herein by reference.

STATEMENT REGARDING FEDERALLY SPONSORED RESEARCH

Not applicable.

BACKGROUND OF INVENTION

1. Field of Invention

The present invention is related to temperature measurement techniques with semiconductor circuitry, a use of which may be to determine diode junction temperatures with greater accuracy than previously known. More specifically, the present invention relates to the method and apparatus of exciting levels of applied collector current $I_C$ to a diode, sensing changes in output characteristics such as base-emitter voltage ($V_{BE}$) values, and calculating diode junction temperature free of series and parallel parasitic effects from a comparison of applied input, sensed output and calculated constant values.

2. Description of Related Art

The accurate determination of the temperature under which a diode is operating may serve vastly different purposes. Diodes, as with many semiconductors, exhibit general temperature dependence where at a given constant diode current, there will be an approximate 2 mV voltage drop across the diode for each 1 degree C. increase in operating temperature. Therefore diode performance is often scaled relative to operating temperatures.

The temperature dependence of a diode allows the diode to be used as a temperature measuring device in several applications, as well as a temperature compensating component in many other circuits. For instance, certain emitter-coupled logic (ECL) gates require a reference voltage in the center of the logic swing for all operating temperatures. The temperature dependence of diodes allows the construction of temperature-compensated bias supply circuits for ECL gates to better serve this purpose. However, a less productive result of this temperature dependence can produce unwanted values as well, such as reverse diode currents. Therefore to ensure proper design, it is often very important to know the operating temperature of operational diodes.

Prior art U.S. Pat. No. 5,195,827, issued Mar. 23, 1993 to Audy et al. sets forth a number of methods to measure diode temperature. One method involves the immersion of the device in a heated or chilled bath. Device input and output values are then measured and used to calibrate the device to the known temperature of the bath. However, as Audy et al. points out, this is a complex and time consuming method and accurate predictions at temperatures other than bath temperature are not guaranteed.

A second method involves the actual placement of a calibrated thermometer on the device. However, it is often difficult to achieve satisfactory contact between device and thermometer, and in addition, once contact is established temperature variations within the device substrate do not guarantee an accurate temperature reading from the point of contact. The prior art further states such temperature measurement techniques are subject to additional inaccuracies due to junction characteristics such as doping densities, junction area and surface defects. A solution addressing these factors has been the use of two separate junctions fabricated on the same substrate, operated at different current levels. Unfortunately this dual junction approach is subject to further inaccuracies due to series base and emitter resistance values present in the device.

As Audy et al. points out, many devices exhibit a defined temperature dependence which may be used to calculate the actual device temperature when several variables are known. Specifically, Audy et al. discloses a temperature measurement technique in which known input signals are applied to a p-n junction device, such as a bipolar transistor, and temperature dependent output signals corresponding to each input signal are measured. Since the operating characteristics of the device are known, a comparison of the excitation levels applied and the temperature dependent output values observed may be used to determine the operating temperature of the device. The applied excitation signal may be either base-emitter voltage $V_{BE}$ or collector current $I_C$. If the applied excitation signal is base-emitter voltage $V_{BE}$, the temperature dependent output value measured is collector current $I_C$, and in a similar fashion, if the applied excitation signal is collector current, the temperature dependent output value measured is base-emitter voltage.

Audy et al. discloses a method which measures semiconductor substrate temperature by exciting and applying three levels of either base-emitter voltage $V_{BE}$ or collector current $I_C$ to a p-n junction device and sensing the varying temperature dependent output signal values. The temperature may then be calculated from the known characteristics of the device through a comparison of the signals. The purpose of a three level excitation signal application is to eliminate parasitic base resistance $r_b$ and the series emitter resistance $r_e$ values present in conventional p-n junction devices.

If only two excitation levels are applied, the temperature measurement will continue to be affected by parasitic base and series emitter resistance as shown in the dual junction approach, resulting in an incorrect measurement. To address this problem, Audy et al. discloses the use of a third excitation level which eliminates the effects of both $r_b$ and $r_e$. It is pointed out a three level excitation method works well with bipolar transistor devices, however when other p-n junction devices such as a conventional diode is measured, the accuracy of the three level excitation method may be degraded for various reasons. One factor leading to measurement degradation is the effects of parallel resistance and offset current effects present in devices such as diodes, which are not fully eliminated using a three level excitation method. Although the three level excitation method works well eliminating the effects of parasitic base resistance and series emitter resistance effects, so called series parasitic effects, the method fails to eliminate the effects of parallel resistances and offset currents, so called parallel parasitic effects. At full temperature this prior art method may read device temperature incorrectly by as much as several degrees C.

The multiple level excitation method taught by Audy et al. eliminates the inaccuracies of parasitic base resistance and emitter resistance through the use of three excitation levels of a single device, rather than a base-emitter voltage $V_{BE}$ comparison between two separate junctions as in the dual junction method. The use of three sequential excitation levels eliminates series resistances such as parasitic base and series emitter resistance but does not address parallel parasitic effects. The prior art method to determine p-n junction device temperature is based on the application of three or more collector currents and may begin with the application of collector currents $I_1$-$I_4$, $$I=[I_1,I_2,I_3,I_4]$$

The temperature dependent output signal base-emitter voltage $\Delta V_{BE}$ is then measured as, $$\Delta V_{BE}=mV_T \times \ln[(I_3 \times I_2)/(I_1 \times I_4)]+R_S(I_3+I_2-I_1-I_4)$$

where $R_S$ represents series parasitic resistance and $\Delta V_{BE}$ represents the change in base-emitter voltage used to determine temperature. If collector currents $I_1$-$I_4$ are chosen such that, $$(I_3+I_2-I_1-I_4)=0$$

then, $$\Delta V_{BE}=mV_T \times \ln[(I_3 \times I_2)/(I_1 \times I_4)]$$

As seen in the prior art resulting equation, the change in base-emitter voltage value $\Delta V_{BE}$ may be calculated free of series parasitic $R_S$ effects, however, current offset and parasitic parallel resistance are not taken into consideration and result in inaccuracies in $\Delta V_{BE}$ calculations. Any temperature calculation based upon $\Delta V_{BE}$ would also include these inaccuracies.

Therefore what is needed is a measurement technique to accurately determine device temperature with the ability to cancel out series parasitic effects, such as voltage offset and series resistance, in addition to parallel parasitic effects, such as leakage current and parallel resistance.

BRIEF SUMMARY OF THE INVENTION

It is the object of the present invention to create a method and apparatus which may be used to determine diode junction temperatures with greater accuracy than previously known. The present invention achieves this goal by testing a device with four or more levels of applied collector current, sensing changes in output characteristics such as base-emitter voltage $V_{BE}$, cancelling or calculating the device leakage current value and cancelling the parallel leakage effects. The cancelled or calculated leakage current consists of both a constant leakage current, current offset, and an additional leakage current due to a parasitic parallel resistance. The p-n junction device temperature may then be measured by exciting four levels of applied collector current and sensing changes in output characteristics such as base-emitter voltage in which both parasitic series resistance and parallel leakage current errors are cancelled. Since the operating characteristics of a p-n junction device are temperature dependent, the excitation levels applied and output values observed may be used to determine the junction temperature of the device free of series and parallel parasitic effects.

The present invention is superior to prior multiple level excitation methods and apparatus in that four or more excitation levels are used to eliminate both series parasitic and parallel parasitic effects. The result is an M-Level excitation method, where M is greater than or equal to four, which produces a more accurate measurement of p-n junction devices than traditional three or four level excitation methods due to parallel parasitic effects. The prior art multiple level excitation methods only cancel series parasitic effects, such as series resistance and voltage offset values.

Through the use of four or more excitation levels, the present invention determines the junction temperature of the device free of both series and parallel resistance effects, and voltage and current offset effects.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF PRESENTLY PREFERRED EXEMPLARY EMBODIMENTS

The present invention provides an improved method and apparatus to measure p-n junction device temperature by testing a device with four or more levels of applied collector current $I_C$, sensing changes in output characteristics such as base-emitter voltage $V_{BE}$, calculating the device leakage current value and cancelling the parallel leakage effects. The calculated leakage current consists of both a constant leakage current, current offset, and an additional leakage current due to a parasitic parallel resistance. The p-n junction device temperature may then be measured by exciting four levels of applied collector current and sensing changes in output characteristics such as base-emitter voltage in which both parasitic series resistance and parallel leakage current errors are cancelled. Since the operating characteristics of a p-n junction device are temperature dependent, the excitation levels applied and output values observed may be used to determine the junction temperature of the device free of series and parallel parasitic effects.

In the preferred embodiment, a diode is shown as the p-n junction device and in this sense, acts as a traditional bipolar transistor with the base and collector connected. However, as pointed out, several parasitic resistance, voltage and current offset values will affect measurements and result in inaccuracies in the calculated temperature value. For instance, series resistance and voltage offset effects, considered series parasitic effects, introduce error into measured base-emitter voltage $V_{BE}$ values as seen in the prior art examples. In addition, measurement errors also result from parallel resistance and current offset effects, considered parallel parasitic effects. The present invention, unlike the earlier prior art, cancels out parallel parasitic effects in addition to series parasitic effects. Therefore the present M-Level excitation method provides improved accuracy when measuring p-n junction device temperature, including diode devices, which respond poorly to the prior art methods.

The new method to determine diode junction temperature begins with the calculation of $\Delta V_{BE}$ in which the first component of parallel parasitic effects, current offset, is introduced for elimination.

$$\Delta V_{BE} = mV_T \times \ln(I_2/I_1) + R_s(I_2 - I_1) + mV_T \times ios(1/I_2 - 1/I_1)$$

In this equation $\Delta V_{BE}$ represents the change in base-emitter voltage, $I_1$ and $I_2$ represent levels of applied excitation current, $R_S$ represents series parasitic resistance and ios represents current offset. The current offset value ios has been added in the equation, representing ios error in $\Delta V_{BE}$ measurement. The parallel resistance $R_P$ value, representing the $R_P$ error in $\Delta V_{BE}$ measurement, is to be considered later. A four level excitation method results in the following base-emitter voltage $\Delta V_{BE}$ calculation, $$\Delta V_{BE}^1 = mV_T \times \ln(I_3/I_1) + R_s(I_3 - I_1) + mV_T \times ios \times A$$
where, $A = [(1/I_3) - (1/I_1)]$
$$\Delta V_{BE}^2 = mV_T \times \ln(I_4/I_2) + R_s(I_4 - I_2) + mV_T \times ios \times B$$
where, $B = [(1/I_4) - (1/I_2)]$
$$\Delta V_{BE} = \Delta V_{BE}^1 - \Delta V_{BE}^2(A/B)$$

If currents are selected such that, $$I_3 - I_1 - (A/B)(I_4 - I_2) = I_3 + I_2(A/B) - I_1 - I_4(A/B) = 0$$

then, $$\Delta V_{BE} = mV_T \times \ln(I_3/I_1) - mV_T(A/B) \times \ln(I_4/I_2)$$

The series parasitic resistance ($R_S$) and current offset ios values are cancelled. For example, $$I = [2, 10, 100, 20]\mu A$$

$$\Delta V_{BE}^1 = mV_T \times \ln(100/2) + R_S(100 - 2) + mV_T \times ios[(1/100) - (1/2)]$$
$$= mV_T \times \ln(100/2) + R_S(98) + mV_T \times ios(-0.490)$$

$$\Delta V_{BE}^2 = mV_T \times \ln(20/10) + R_S(20 - 10) + mVT \times ios[(1/20) - (1/10)]$$
$$= mV_T \times \ln(20/10) + R_S(10) + mV_T \times ios(-0.05)$$

$$\Delta V_{BE} = \Delta V_{BE}^1 - \Delta V_{BE}^2(0.490/0.05)$$
$$= mV_T \times \ln(100/2) - mV_T \times 9.8[\ln(20/10)] + R_S(98 - 9.8 \times 10) + mV_T \times ios(-0.490 + 0.05 \times 9.8)$$
$$= mV_T \times \ln(100/2) - mV_T \times 9.8 \ln(20/10)$$

The influences of series resistance $R_S$ and current offset ios have been cancelled. However, a comparison with the prior art four level excitation method base-emitter voltage $\Delta V_{BE}$ calculation not considering current offset shows there is no common solution for both the new method and the prior art method unless the $\Delta V_{BE}$ of the measurement is zero.

Adding an additional current level increases degrees of freedom by 1 allowing measurements to be optimized. If five levels of excitation are used, such that collector currents $I_1$–$I_5$ are applied, $$I = [I_1, I_5, I_2, I_3, I_4]$$

The temperature dependent output values $\Delta V_{BE}$ may then be calculated as, $$\Delta V_{BE}^1 = mV_T \times \ln[(I_3 \times I_2)/(I_1 \times I_4)] + R_s(I_3 + I_2 - I_1 - I_4) + mV_T \times ios \times A \text{ where, } A = (1/I_3 + 1/I_2 - 1/I_1 - 1/I_4)$$

$$\Delta V_{BE}^2 = mV_T \times \ln[(I_5 \times I_5)/(I_1 \times I_2)] + R_s(I_5 + I_5 - I_1 - I_2) + mV_T \times ios \times B \text{ where, } B = (2/I_5 - 1/I_1 - 1/I_2)$$

$$\Delta V_{BE} = \Delta V_{BE}^1 - \Delta V_{BE}^2(A/B)$$
$$= mV_T \times \ln[(I_3 \times I_2)/(I_1 \times I_4)] + R_S[I_3 + I_2 - I_1 - I_4 - (A/B)((2 \times I_5) - I_1 - I_2)] + mV_T \times ios[A - (B \times (A/B))]$$

If currents are selected such that, $$I_3 + I_2 - I_1 - I_4 - A/B((2 \times I_5) - I_1 - I_2) = 0$$

And if, $$I_5 = \sqrt{I_1 \times I_2}$$

then, $$\Delta V_{BE} = mV_T \times \ln[(I_3 \times I_2)/(I_1 \times I_4)]$$

If the following five excitation levels are applied as collector currents, $$I = [I_1, I_5, I_2, I_3, I_4] = [1, 5, 25, 50, 97.76]\mu A$$

The temperature dependent output values $\Delta V_{BE}$ are determined as, $$\Delta V_{BE}^1 = mV_T \times \ln[(50 \times 25)/(1 \times 97.76)] + R_S(50 + 25 - 1 - 97.76) + mV_T \times ios(1/50 + 1/25 - 1/1 - 1/97.76)$$
$$= mV_T \times \ln(12.787) + R_S(-23.70) + mV_T \times ios(-0.9502)$$

$$\Delta V_{BE}^2 = mV_T \times \ln[5 \times 5/(1 \times 25)] + R_S(-16) + mV_T \times ios(-0.6400)$$

$$\Delta V_{BE} = \Delta V_{BE}^1 - \Delta V_{BE}^2(1.485)$$
$$= mV_T \times \ln(12.787)$$

Figure 1:
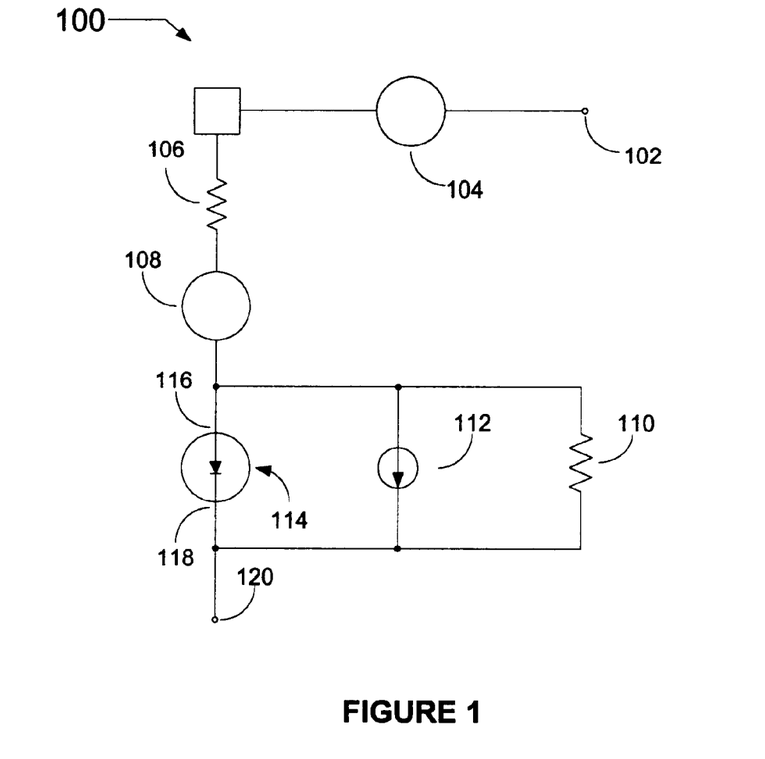
FIG. 1 illustrates a diode circuit in which series and parallel resistance is modeled, as well as voltage and current offset.

FIG. 1 introduces the modeled parasitic effects eliminated through the use of the M-Level temperature measurement technique. In FIG. 1, an illustrative circuit 100 is shown which includes series parasitic resistance 106, series voltage offset 108, parallel parasitic resistance 110, parallel current offset 112 and the affected device, diode 114. The diode 114, including a cathode 118 and an anode 116, acts as a traditional bipolar transistor with the base and collector connected. The anode 116 of diode 114 is electrically coupled to the resistance 106 via the voltage offset 108

| PRIOR ART | M-LEVEL CONSIDERING CURRENT OFFSET |
|---|---|
| $\Delta V_{BE} = mV_T \times \ln[(I_3 \times I_2)/(I_1 \times I_4)]$ | $\Delta V_{BE} = mV_T \times \ln(I_3/I_1) - mV_T \times 9.8 \ln(I_4/I_2)$ | completing the series effects, and the current offset 112 and the parallel resistance 110 are each electrically coupled in parallel to the diode 114 completing the parallel effects.

Figure 2:
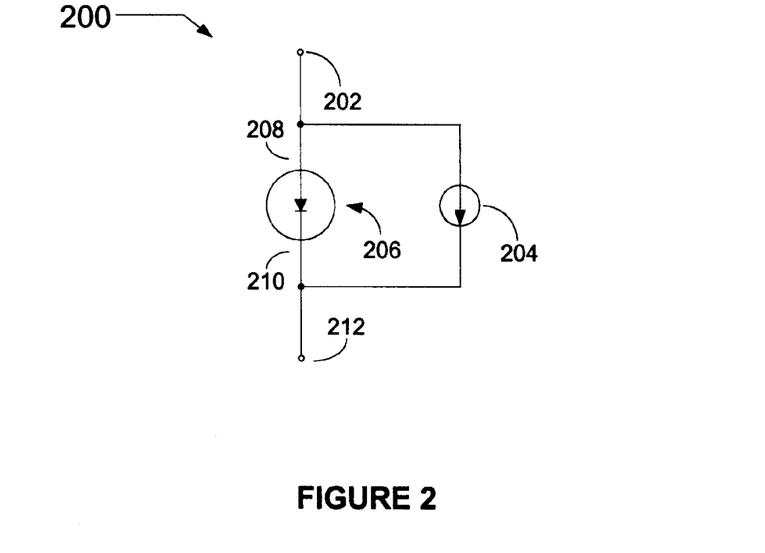
FIG. 2 illustrates a simplified diode circuit in which only current offset is modeled.

FIG. 2 introduces the simplified model for the elimination of current offset effects in temperature measurement through the M-Level temperature measurement technique. FIG. 2 shows a simplified circuit 200 with current offset only and includes a diode 206 and current offset 204. The diode 206 includes a cathode 210 and an anode 208, and the current offset 204 is electrically coupled in parallel. In FIG. 2, if a prior art four levels of excitation are used such that collector currents $I_1$–$I_4$ do not meet current ios cancelling conditions previously discussed, ios is not cancelled, and we can see the effects of ios to the Vbe measurements. As per prior art, apply a four level current to the forward biased diode 206.

$$I=[I_1, I_2, I_3, I_4]=[2, 10, 92, 100] \mu A$$

The temperature dependent output values $\Delta V_{BE}$ (voltage across anode 208 and cathode 210) for each excitation level are, $$V_{BE}=[V_{BE}^1, V_{BE}^2, V_{BE}^3, V_{BE}^4]$$

$$\Delta V_{BE}^{3,1}=V_{BE}^3-V_{BE}^1$$

$$\Delta V_{BE}^{3,1}=mV_T\times\ln[(92+ios)/(2+ios)] \quad \text{equation 1}$$

$$\Delta V_{BE}^{4,2}=V_{BE}^4-V_{BE}^2$$

$$\Delta V_{BE}^{4,2}=mV_T\times\ln[(100+ios)/(10+ios)] \quad \text{equation 2}$$

$$\Delta V_{BE}=\Delta V_{BE}^{3,1}-\Delta V_{BE}^{4,2}$$

$$\Delta V_{BE}=mV_T[\ln((92+ios)/(2+ios))-\ln((100+ios)/(10+ios))]$$

$$\Delta V_{BE}=mV_T[\ln(92/2)\times((1+ios/92)/(1+ios/2))-\ln(100(1+ios/100)/10(1+ios/10))]$$

For current offset 204 (ios) in the range of tens of nA, $$1 >> ios/2 > ios/10 > ios/92 > ios/100$$

The temperature dependent output value $\Delta V_{BE}$ (voltage across anode 208 and cathode 210) may then be measured as, $$\Delta V_{BE}=mV_T[\ln(92/2)-\ln(100/10)]+mV_T[ios/92-ios/2-ios/100+ios/10]$$

$$V_{BE}=mV_T\ln[(92\times10)/(2\times100)]+mV_T[-ios/2+ios/10+ios/92-ios/100]$$

$$\Delta V_{BE}=\Delta V_{BE}^0+d\Delta V_{BE} \quad \text{equation 3}$$

where, $$\Delta V_{BE}^0=mV_T\times\ln[(92\times10)/(2\times100)] \quad \text{equation 3a}$$

$$d\Delta V_{BE}=-mV_T(ios/2-ios/10-ios/92+ios/100) \quad \text{equation 3b}$$

The calculated base-emitter voltage $\Delta V_{BE}^0$ is the pure measurement without the current offset ios effects. The measurement error due to current offset 204 (ios) is $d\Delta V_{BE}$. The current offset 204 (ios) only influences the $\Delta V_{BE}$ measurement significantly at low currents, e.g. 2 and 10 $\mu A$. For higher currents, the influence can be ignored, e.g. ios/92 or ios/100. This is a very important concept to the extent that this method cancels out parallel resistance $R_P$ effects as well. As will be seen in the following equations, the parallel resistance $R_P$ acts like a constant current offset 204 when four levels of excitation are used.

If, $$\Delta V_{BE}=\Delta V_{BE}^0+d\Delta V_{BE}$$

$$\Delta V_{BE}=mV_T\times\ln[(92\times10)/(2\times100)]-mV_T(ios/2-ios/10)$$

$$\Delta V_{BE}=mV_T\times\ln[(92\times10)/(2\times100)]-mV_T[(4\times ios)/10] \quad \text{equation 4}$$

If for example, there is a leakage current offset ios=15 nA, using the prior art method, $$\Delta V_{BE} = mV_T \times \ln[(92\times10)/(2\times100)] -$$
$$mV_T[(4\times-0.015\ \mu A)/10\ \mu A]$$
$$= mV_T \times 1.526 - mV_T \times 0.006$$

$$\Delta T=303(K)\times(0.006/1.526)=1.2°\ C.$$

A temperature of 1.2° C. higher is read. If we add two more levels of excitation to the device, $I_5,I_6=(4, 8)$ $\mu A$, then, $$dV_{BE}^1=mV_T\times\ln(4/2)+mV_T[(ios/4)-(ios/2)]$$

$$dV_{BE}^1=mV_T\times\ln(4/2)+mV_T(-ios/4) \quad \text{equation 5}$$

$$dV_{BE}^2=mV_T\times\ln(8/4)+mV_T[(ios/8)-(ios/4)] \quad \text{equation 6}$$

$$dV_{BE}^2=mV_T\times\ln(8/4)+mV_T(-ios/8)$$

$$\Delta dV_{BE}=dV_{BE}^1-dV_{BE}^2$$

$$\Delta dV_{BE}=mV_T(-ios/4)+mV_T(ios/8)$$

$$\Delta dV_{BE}=mV_T(-ios/8) \quad \text{equation 7}$$

Recall that equation 4 produced, $$d\Delta V_{BE}=-mV_T[(4\times ios)/10]$$

$$d\Delta V_{BE}=-mV_T[(ios/8)\times((8\times4)/10)]$$

$$d\Delta V_{BE}=3.2\Delta dV_{BE} \quad \text{equation 8}$$

Therefore, if collector currents $I_1,I_5,I_6=(2, 4, 8)$ $\mu A$ are used to measure $\Delta dV_{BE}$ and equation 8 is used to cancel out the measurement error $d\Delta V_{BE}$ in equation 4, we obtain the true $\Delta V_{BE}$ measurement without the influence of current offset 204 (ios). A simplified flowchart in FIG. 6 illustrates the steps taken.in the new method of current offset effect elimination.

Figure 6:
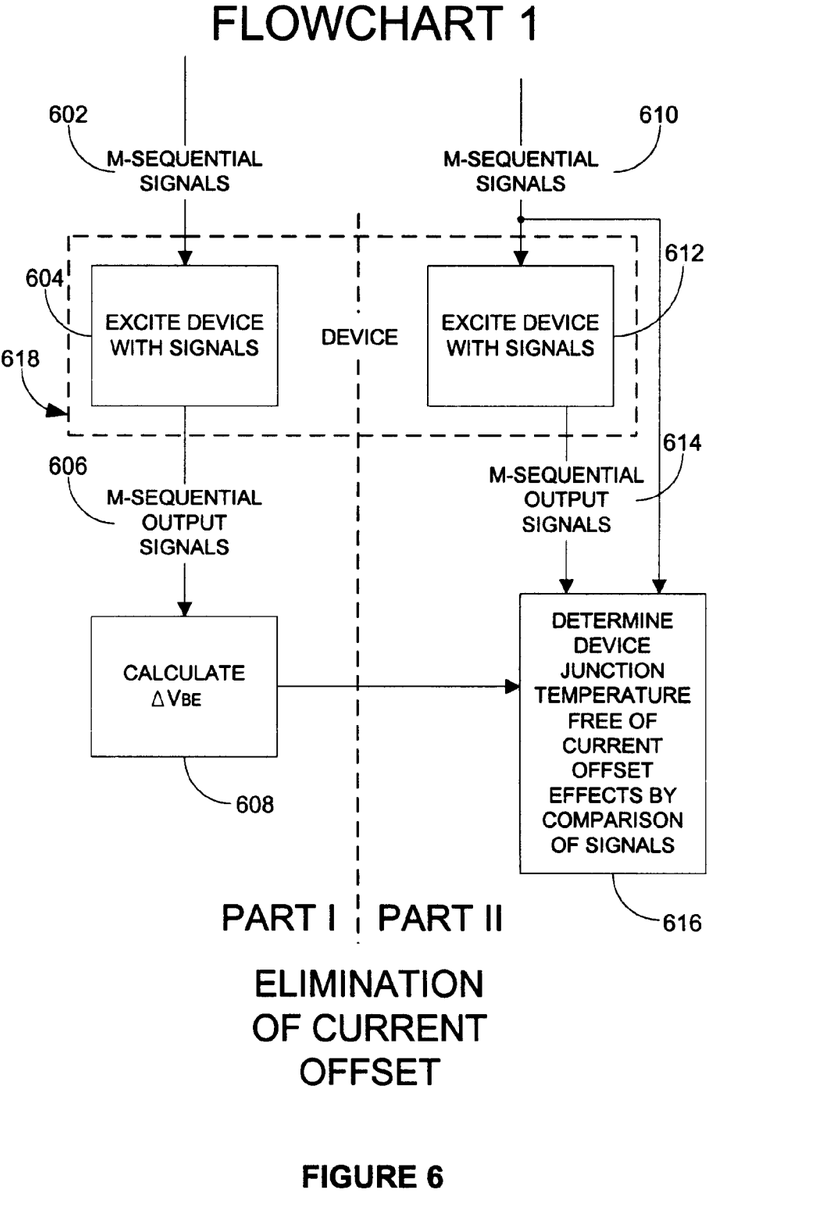
FIG. 6 is a flow chart of the current offset elimination method in accordance with one embodiment of the present invention.

In FIG. 6, two Parts are shown, Part 1 in which the current offset error is determined, and Part 2 in which the calculated current offset error is eliminated from the temperature determination. In Part 1 of FIG. 6, the excitation levels shown at 602 and described as $I_1$–$I_6$, are applied to the device 618 at 604, resulting in sequential output signals ($V_{BE}$) 606. The sequential output signals are used to calculate the current offset error $d\Delta V_{BE}$ at 608.

In Part 2 of FIG. 6, excitation levels shown at 610 and described as $I_1$–$I_4$, are applied to the device 618 at 612, resulting once again in sequential output signals 614. These excitation levels shown at 610 are not required to be four new additional excitation levels. The excitation levels may be $I_1$–$I_4$ of the M-Level excitation levels shown at 602 and included in $I_1$–$I_6$. In Part 2 however, the measurement error value $d\Delta V_{BE}$ calculated in Part 1 is cancelled from $\Delta V_{BE}$ calculations. The temperature calculation in 616 is then determined from a comparison of the sequential output signals 614 and the sequential test signals 610, free of current offset effects.

Figure 3:
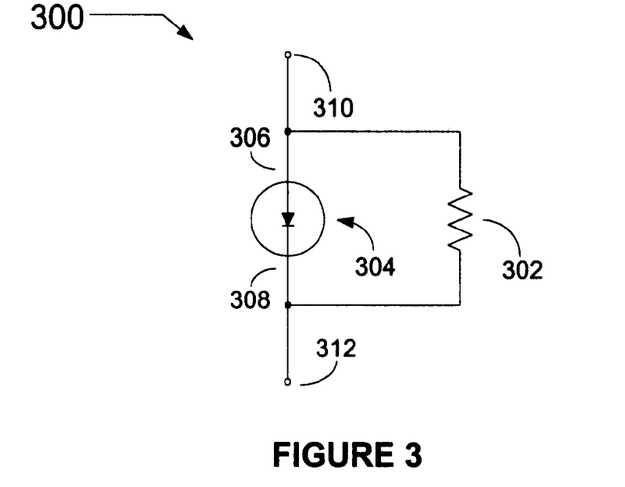
FIG. 3 illustrates a simplified diode circuit in which only parallel resistance is modeled.

We may extend the concept for parallel resistance $R_P$, which creates an additional leakage current dependent on Vbe. FIG. 3 introduces the simplified model of the elimination of parallel parasitic resistance $R_P$ in temperature measurement through a similar use of the M-Level temperature measurement technique. FIG. 3 shows a simplified circuit 300 with parallel parasitic resistance only and includes a diode 304 and resistance 302 which is electrically coupled in parallel.

Define a leakage current through $R_p$ the parallel resistance 302 as ilk, $$I_{lk} = V_{BE}/R_p$$

Recalling equation 3b, the leakage current influences the $\Delta V_{BE}$ by $d\Delta V_{BE}$ and thus influences the temperature measurement.

$$d\Delta V_{BE} = m \times V_T \times \Sigma(i_{lk}/I)$$

$$d\Delta V_{BE} = m \times (V_T/R_P) \times \Sigma(V_{BE}/I)$$

As the excitation current I increases, $V_{BE}$ increases logarithmically. The contribution of $d\Delta V_{BE}$ sharply drops at large levels of excitation current. The largest contribution of $d\Delta V_{BE}$ is at low excitation current levels. Because the $V_{BE}$ differences are small compared to the individual $V_{BE}$ measurements, ilk can be treated as a constant leakage current offset without significantly impacting accuracy. Take a real measurement as an example. In FIG. 3, if a M-Level excitation method is used such that collector currents $I_1$–$I_6$ are applied to the forward biased diode 304, $$I = [I_1, I_2, I_3, I_4, I_5, I_6] = [2, 4, 8, 10, 92, 100] \mu A$$

The temperature dependent output values $V_{BE}$ (voltage across anode 306 and cathode 308) for each excitation level are, $$V_{BE} = [557.707, 576.4766, 595.2266, 601.2661, 662.1276, 664.4616] mV$$

$$V_{BE}/557.707 = [1, 1.0337, 1.0673, 1.0781, 1.1872, 1.1914]$$

This data shows that an increase in excitation current by a factor of 50 causes $V_{BE}$ to increase by a factor of only 1.1914.

The contribution of $d\Delta V_{BE}$ without treating the parallel leakage current offset as a constant is, $$I = [2, 10, 92, 100] \mu A$$

$$V_{BE} = [557.71, 601.27, 662.13, 664.46] mV$$

$$i_{lk} = V_{BE}/R_P$$

$$d\Delta V_{BE}^1 = m \times V_T \times [(i_{lk1}/I_1) - (i_{lk2}/I_2) - (i_{lk3}/I_3) + (i_{lk4}/I_4)]$$

$$d\Delta V_{BE}^1 = m \times V_T/R_P \times [(V_{BE}^1/I_1) - (V_{BE}^2/I_2) - (V_{BE}^3/I_3) + (V_{BE}^4/I_4)]$$

$$d\Delta V_{BE}^1 = m \times V_T/R_P \times 218.17 \, k\Omega$$

The contribution of $d\Delta V_{BE}$ if the parallel leakage current offset is assumed to be constant is:

Assume, $i_{lk} = V_{BE}^1/R_P$ for all levels of excitation.

$$d\Delta V_{BE}^2 = m \times V_T \times i_{lk} \times [(1/I_1) - (1/I_2) - (1/I_3) + (1/I_4)]$$

$$d\Delta V_{BE}^2 = m \times V_T/R_P \times V_{BE}^1 \times [(1/I_1) - (1/I_2) - (1/I_3) + (1/I_4)]$$

$$d\Delta V_{BE}^2 = m \times V_T/R_P \times 222.60 \, k\Omega$$

This result shows that $d\Delta V_{BE}^2$ is only 2% different from $d\Delta V_{BE}^1$. Therefore, treating the parallel leakage current as a constant current offset cancels on the order of 98% of the ilk error. In an earlier discussion we found that a 15 nA current offset would contribute 1.2° C. of error to a temperature measurement. Thus, using the M-Level method to compensate for parasitic parallel resistance leaves a residual error of only about 0.03° C.

Figure 4:
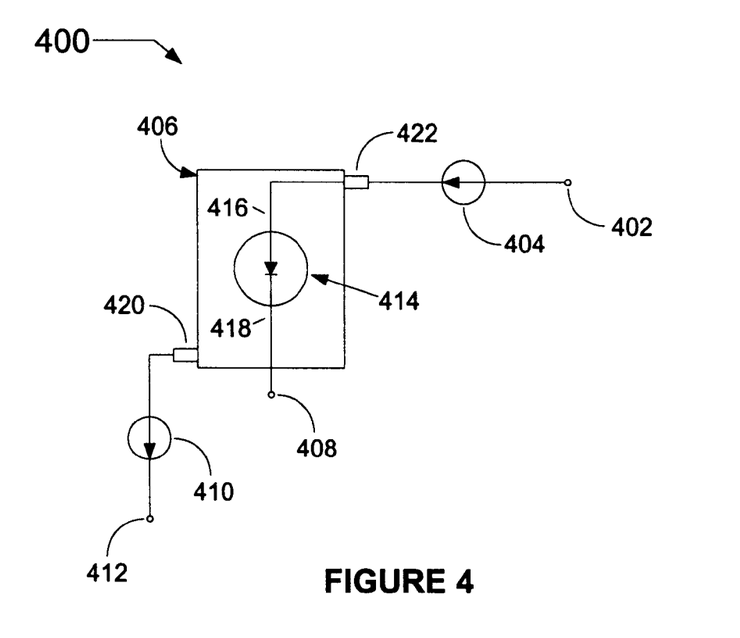
FIG. 4 illustrates a diode circuit in use in a test device in accordance with one embodiment of the present invention.
Figure 5:
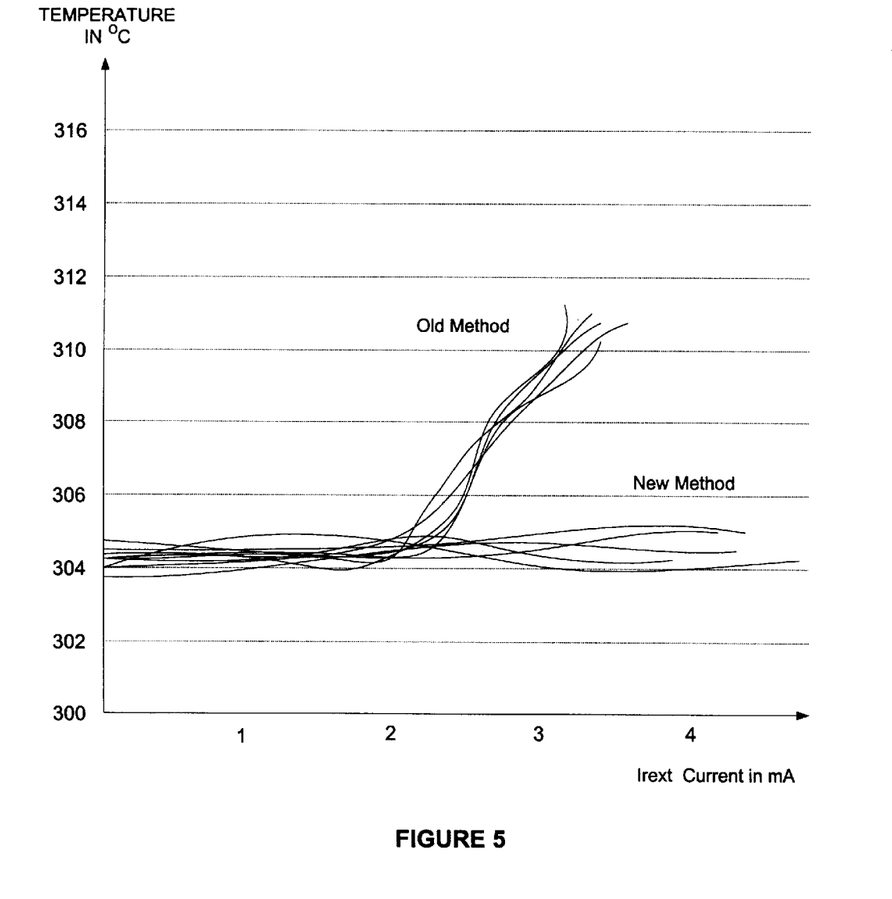
FIG. 5 illustrates typical results of the M-Level excitation method of the present invention compared with the prior art three and four level excitation methods.

Since both the parasitic series influences and parallel influences are cancelled, the temperature measurement derived from base-emitter voltage $V_{BE}$ values does not include the inaccuracies of the prior art models. The new M-Level excitation method results in a more accurate measurement. In FIG. 4, a device is shown in diagram 400 to illustrate these test results. A Multiple Level current source is provided at 404, electrically coupled to the anode 416 of diode 414 via pin 422. By pulling pin 420 of the test device 406 below ground and conducting a current 410, a leakage current is created in diode 414 while simultaneously measuring $V_{BE}$ values. As can be seen in FIG. 5, at a constant device temperature, if current value 410, Irext (FIG. 5), increases creating larger and larger leakage currents, the prior art four level excitation method results in larger and larger inaccuracies in temperature measurements. The new multiple level excitation method maintains an accurate reading, illustrating the corrective effects of the new method.

We claim:

1. A device junction temperature sensing method free of series and parallel parasitic effects comprising the steps of:
   a. modeling an electrical device having input and output electrodes, to have series and, parallel parasitic effects, said series parasitic effects comprised of a voltage offset and a parasitic series resistance, and said parallel parasitic effects comprised of current offset error, and leakage current error due to parasitic parallel resistance;
   b. calculating values for M levels of input excitation currents such that current offset error cancelling conditions are satisfied;
   c. exciting said device with said calculated M levels of input excitation currents to produce M levels of temperature dependent output values, said M levels of temperature dependent output values comprised of M base-emitter voltage (Vbe) values, where said M is greater than or equal to four;
   d. calculating a first and second ΔVbe using said calculated M levels of input excitation currents;
   e. calculating a third ΔVbe from said first and second ΔVbe, said third ΔVbe calculation no longer including said voltage offset, parasitic series resistance, current offset error and leakage current error due to parasitic parallel resistance, wherein;
      said calculation of said third ΔVbe eliminating said voltage offset and said parasitic series resistance;
      said use of said calculated values for M levels of input excitation currents in said calculation of said third ΔVbe eliminating said current offset error; and
      said elimination of said current offset error eliminating a large part of said leakage current error effects due to parasitic parallel resistance; and
   f. determining junction temperature of said device from said third ΔVbe calculation free of said series and parallel parasitic effects.

2. The method as recited in claim 1 wherein said voltage offset elimination results from said calculation of third ΔVbe, said elimination improving said junction temperature determination.

3. The method as recited in claim 1 wherein said parasitic series resistance elimination results from said calculation of third ΔVbe, said elimination improving said junction temperature determination.

4. The method as recited in claim 1 wherein said current offset error elimination results from the use of said calculated M levels of input excitation currents in said calculation of third ΔVbe, said elimination further serving to eliminate a large part of said leakage current error, said elimination improving said junction temperature determination.

5. The method as recited in claim 1 wherein said current offset error cancelling conditions of said values for M levels of input excitation current I are satisfied where:

$$I_3 - I_1 - (A/B)(I_4 - I_2) = I_3 + I_2(A/B) - I_1 - I_4(A/B) = 0$$

wherein M=4; $A=[(1/I_3)-(1/I_1)]$; $B=[(1/I_4)-(1/I_2)]$; and $I_1$, $I_2$, $I_3$ and $I_4$ are said 4 levels of input excitation current I.

6. The method as recited in claim 1 wherein said device is a p-n junction device.

7. The method as recited in claim 6 wherein said p-n junction device is a diode, said diode comprising a diode-connected bipolar transistor with base electrode and collector electrode connected.

8. The method as recited in claim 7 wherein said M electrical input signals are applied collector currents to said p-n junction device, and said M electrical output signals are base-emitter voltages of said p-n junction device.

9. A diode junction temperature sensing apparatus comprising:
   a. a diode having a non-linear input-output characteristic that varies with temperature and is subject to series and parallel parasitic effects, said diode comprised of an anode and cathode, said anode electrically coupled to said cathode via a junction, said series parasitic effects comprised of a voltage offset and a parasitic series resistance, and said parallel parasitic effects comprised of current offset error, and leakage current error due to parasitic parallel resistance;
   b. an M-Level source electrically coupled to said anode for applying M sequential electrical input signals of different values to said anode such that said diode produces M electrical output signals, said M greater than or equal to four, said different values of said M sequential electrical input signals calculated to satisfy current offset error cancelling conditions; and
   c. a test device for measuring said M electrical output signals and calculating temperature of said junction, said test device electrically coupled to said diode and said M-Level source, said test device eliminating said voltage offset, parasitic series resistance and current offset error from said M electrical output signal values, said elimination of said current offset error further reducing said leakage current error due to parasitic parallel resistance, said elimination resulting in said test device determining temperature of said junction of said diode from said M electrical output signals and said M electrical input signals free of said series and parallel parasitic effects.

10. The apparatus as recited in claim 9 wherein said diode is a diode-connected bipolar transistor with base and collector electrodes connected.

11. The apparatus as recited in claim 10 wherein said M-Level source applies said M electrical input signals as collector currents to said anode of said diode, said collector currents satisfying said current offset error cancelling condition:

$$I_3 - I_1 - (A/B)(I_4 - I_2) = I_3 + I_2(A/B) - I_1 - I_4(A/B) = 0$$

wherein M=4; $A=[(1/I_3)-(1/I_1)]$; $B=[(1/I_4)-(1/I_2)]$; and $I_1$, $I_2$, $I_3$ and $I_4$ are said 4 levels of input excitation current I.

12. The apparatus as recited in claim 11 wherein said M electrical output signals are base-emitter voltages of said diode.

13. The apparatus as recited in claim 12 wherein said test device calculates a first, second and third ΔVbe.

14. The apparatus as recited in claim 13 wherein said test device calculates said junction temperature from said third ΔVbe.

15. A diode junction temperature sensing apparatus comprising:
   a. a diode having a non-linear input-output characteristic that varies with temperature and is subject to series and parallel parasitic effects, said diode comprised of an anode and cathode, said anode electrically coupled to said cathode via a junction, said series parasitic effects comprised of a voltage offset and a parasitic series resistance, and said parallel parasitic effects comprised of current offset error, and leakage current error due to parasitic parallel resistance;
   b. an M-Level source electrically coupled to said anode for applying M sequential electrical input signals of different values to said anode such that said diode produces M electrical output signals, said M greater than or equal to four, said different values of said M sequential electrical input signals calculated to satisfy current offset error cancelling conditions;
   c. a means for measuring said M electrical output signals;
   d. a means for eliminating said voltage offset and current offset error from said M electrical output signal values;
   e. a means for eliminating said parasitic series resistance and said leakage current error due to parasitic parallel resistance from said M electrical output signal values; and
   f. a means for determining temperature of said junction of said diode from said M electrical output signals and said M electrical input signals free of said series and parallel parasitic effects.

16. The apparatus as recited in claim 15 wherein said diode is a diode-connected bipolar transistor with base and collector electrodes connected.

17. The apparatus as recited in claim 16 wherein said M-Level source applies said M electrical input signals as collector currents to said anode of said diode, said collector currents satisfying said current offset error cancelling condition:

$$I_3 - I_1 - (A/B)(I_4 - I_2) = I_3 + I_2(A/B) - I_1 - I_4(A/B) = 0$$

wherein M=4; $A=[(1/I_3)-(1/I_1)]$; $B=[(1/I_4)-(1/I_2)]$; and $I_1$, $I_2$, $I_3$ and $I_4$ are said 4 levels of input excitation current I.

18. The apparatus as recited in claim 17 wherein said M electrical output signals are base-emitter voltages of said diode.

19. The apparatus as recited in claim 18 wherein said means for determining temperature calculates a first, second and third ΔVbe.

20. The apparatus as recited in claim 19 wherein said means for determining temperature calculates said junction temperature from said third ΔVbe.

* * * * *